(12) United States Patent
Shan et al.

(10) Patent No.: US 11,557,029 B2
(45) Date of Patent: Jan. 17, 2023

(54) METHOD FOR DETECTING AND RECOGNIZING SURFACE DEFECTS OF AUTOMATED FIBER PLACEMENT COMPOSITE BASED ON IMAGE CONVERTED FROM POINT CLOUD

(71) Applicant: Nanjing University of Aeronautics and Astronautics, Nanjing (CN)

(72) Inventors: Zhongde Shan, Nanjing (CN); Jun Wang, Nanjing (CN); Anyi Huang, Nanjing (CN); Qian Xie, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 17/574,827

(22) Filed: Jan. 13, 2022

(65) Prior Publication Data

US 2022/0198647 A1  Jun. 23, 2022

(51) Int. Cl.
*G06T 7/00* (2017.01)
*G06T 7/50* (2017.01)
(Continued)

(52) U.S. Cl.
CPC .............. *G06T 7/0004* (2013.01); *G06T 7/11* (2017.01); *G06T 7/30* (2017.01); *G06T 7/50* (2017.01);
(Continued)

(58) Field of Classification Search
CPC . G06T 7/0004; G06T 7/11; G06T 7/30; G06T 7/50; G06T 2200/04;
(Continued)

(56) References Cited

U.S. PATENT DOCUMENTS

2012/0250978 A1  10/2012  Taylor
2018/0189611 A1*  7/2018  Dal Mutto ............ G06V 20/64
2018/0268257 A1  9/2018  Ren et al.

FOREIGN PATENT DOCUMENTS

CN  107862293 A  3/2018
CN  111462120 A  7/2020
(Continued)

OTHER PUBLICATIONS

Daxiao Chen.Research on Scattered Point Cloud Data Preprocessing Algorithms,"China Excellent Doctoral and Master's Thesis Full-text Database (Master) Information Technology Series". 2017.
(Continued)

*Primary Examiner* — Kenny A Cese

(57) ABSTRACT

A method for detecting and recognizing surface defects of an automated fiber placement composite based on an image converted from point clouds, including: acquiring a surface point cloud of the automated fiber placement composite; fitting a plane to surface point data; calculating a distance from each point of the surface point cloud to a fitted plane; enveloping the surface point cloud by OBB, and generating a grayscale image according to the OBB and the distance; constructing a pre-trained semantic segmentation network for defect of fiber placement, and inputting the grayscale image to segment and recognize defect areas thereon; mapping a segmentation result output by the semantic segmentation network to the point cloud followed by defect evaluation and visualization.

6 Claims, 3 Drawing Sheets

(51) Int. Cl.
  *G06T 7/11* (2017.01)
  *G06V 10/77* (2022.01)
  *G06V 10/774* (2022.01)
  *G06V 20/70* (2022.01)
  *G06T 7/30* (2017.01)
  *G06V 10/776* (2022.01)
  *G06V 10/25* (2022.01)
  *G06V 10/26* (2022.01)

(52) U.S. Cl.
  CPC ........ *G06V 10/776* (2022.01); *G06V 10/7715* (2022.01); *G06V 10/7747* (2022.01); *G06V 20/70* (2022.01); *G06T 2200/04* (2013.01); *G06T 2207/10024* (2013.01); *G06T 2207/10028* (2013.01); *G06T 2207/20021* (2013.01); *G06T 2207/20081* (2013.01); *G06T 2207/30108* (2013.01)

(58) Field of Classification Search
  CPC . G06T 2207/10024; G06T 2207/10028; G06T 2207/20021; G06T 2207/20081; G06T 2207/30108; G06T 2207/20084; G06V 10/7715; G06V 10/7747; G06V 10/776; G06V 20/70; G06V 10/25; G06V 10/267; G06N 3/0454; G06N 3/04
  See application file for complete search history.

(56) References Cited

FOREIGN PATENT DOCUMENTS

| CN | 111507357 A | 8/2020 |
| CN | 112308974 A | 2/2021 |

OTHER PUBLICATIONS

Qian Xie et al. Aircraft Skin Rivet Detection Based on 3D Point Cloud via Multiple Structures Fitting. "Computer-Aided Design". 2019.

* cited by examiner

METHOD FOR DETECTING AND RECOGNIZING SURFACE DEFECTS OF AUTOMATED FIBER PLACEMENT COMPOSITE BASED ON IMAGE CONVERTED FROM POINT CLOUD

CROSS-REFERENCE TO RELATED APPLICATIONS

This application claims the benefit of priority from Chinese Patent Application No. 202110177985.5, filed on Feb. 9, 2021. The content of the aforementioned application, including any intervening amendments thereto, is incorporated herein by reference in its entirety.

TECHNICAL FIELD

The present application relates to industrial automatic detection, and more particularly to a method for detecting and recognizing surface defects of an automated fiber placement composite based on an image converted from point clouds.

BACKGROUND

The extensive application of composite materials in the high-teach fields such as aerospace and automobiles has promoted the enhancement of the manufacturing process and precision of composite products. The particularity of the composite material renders its manufacturing process relatively complicated. Initially, some composite materials are made by hand lay-up. With the development and application of the automation technology, 3D braiding, filament winding, and automated fiber placement have gradually emerged. As one of the representative techniques for the fabrication of resin-based composites, the automated fiber placement involves not only the material manufacturing process, but also the CAD/CAM/CAE technologies and the electromechanical automation control. Currently, the automated fiber placement has been widely employed for the manufacturing of aerospace-related components.

However, during the automated fiber placement process of composite materials, some external defects (such as warping, wrinkling, twisting and lapping) will occur due to the insufficient equipment precision and fiber placement trajectory. To meet the precision requirements of composite products in the practical application, it is extremely critical and urgent to quantitatively evaluate the defects while detecting the categories of surface defects of the automated fiber placement composites. Unfortunately, most of the existing detection methods are still carried out by eye detection, resulting in low efficiency. Moreover, the visual fatigue caused by long-term manual operation will inevitably bring a declined in the detection accuracy. In recent years, with the development of computer vision technology, various image-based methods for detecting the surface defects of the automated fiber placement composites have been proposed to recognize the defects. In view of the dependence on color images, these detection approaches are susceptible to light and fail to further evaluate the defect level, limiting the application scope.

SUMMARY

An objective of this application is to provide a method for detecting and recognizing surface defects of an automated fiber placement composite based on an image converted from point clouds with high detection efficiency and accuracy and desirable applicability to overcome the deficiencies in the prior art.

Technical solutions of this application are described as follows.

This application provides a method for detecting and recognizing surface defects of an automated fiber placement composite based on an image converted from point clouds, comprising:

(S1) acquiring a surface point cloud of the automated fiber placement composite;

(S2) fitting a plane to the surface point cloud;

(S3) calculating a distance from each point of the surface point cloud to a fitted plane;

(S4) enveloping the surface point cloud by an oriented bounding box (OBB) and generating a grayscale image according to the OBB and the distance calculated in step (S3);

(S5) constructing a pre-trained semantic segmentation network for defect of fiber placement, and inputting the grayscale image generated in step (S4) into the pre-trained semantic segmentation network to segment and recognize defect areas on the grayscale image; and (S6) mapping a segmentation result by the semantic segmentation network to the point clouds followed by defect evaluation and visualization.

In an embodiment, the step (S1) is performed through steps of:

placing the automated fiber placement composite on a linear motor module motion platform, and setting up a 3D camera directly above the linear motor module motion platform; after fiber placement, driving, by the linear motor module motion platform, the automated fiber placement composite to move through an area captured by the 3D camera to complete an acquisition of the surface point cloud of the automated fiber placement composite.

In an embodiment, the step (S2) is performed through steps of: (S201) randomly selecting three non-collinear points from the surface point cloud, and calculating an equation of a plane determined by the three non-collinear points;

(S202) setting a threshold T, and calculating a distance from other points in the surface point cloud to the plane determined by the three non-collinear points, wherein when a<T, a corresponding point is regarded as an interior point; and (S203) repeating steps (S201)-(S202) for/times; wherein/ is a preset maximum number of iterations; selecting a plane with the most interior points; and fitting all interior points to obtain a final plane equation: $Ax+By+Cz+D=0$.

In an embodiment, the step (S3) is performed through steps of:

calculating an Euclidean distance from each point of the surface point cloud to the fitted plane; wherein an equation for calculating a distance d from a point $(x_0, y_0, z_0)$ to a plane $Ax+By+Cz+D=0$ is expressed as follows:

$$d = \frac{|Ax_0 + By_0 + Cz_0 + D|}{\sqrt{A^2 + B^2 + C^2}}. \qquad (1)$$

In an embodiment, the step (S4) is performed through steps of:

(S401) by means of an OBB algorithm, determining a minimum bounding box enveloping the surface point cloud;

(S402) uniformly dividing the minimum bounding box into 512*512 sub-bounding boxes along a direction parallel to the fitted plane;

(S403) calculating a distance between each point in each of the plurality of sub-bounding boxes and the fitted plane, and calculating an average distance between each of the plurality of sub-bounding boxes and the fitted plane; and (S404) normalizing the average distance between each of the plurality of sub-bounding boxes and the fitted plane, and converting a normalized average distance into an image gray scale ranging from 0 to 255, such that the surface point cloud included in each of the plurality of sub-bounding boxes is defined as a pixel, and the average distance between each of the plurality of sub-bounding boxes and the fitted plane is taken as a gray value of the corresponding pixel to generate a plane distance error image with a size of 512*512.

In an embodiment, the step (S5) is performed through steps of:

(S501) constructing a semantic segmentation network for defect of the fiber placement based on U-Net, wherein an input of the semantic segmentation network is the plane distance error image; the semantic segmentation network comprises a downsampling network and an upsampling network; the downsampling network uses a 3*3 convolutional layer for feature extraction; every two convolutional layers are followed by a maximum pooling layer for downsampling, and such repeating structure has five layers; subsequently subjecting an output of the downsampling network to upsampling using a 2*2 deconvolutional layer; wherein after the upsampling, two 3*3 convolutional layers are adopted for feature extraction, and such repeating structure has four layers to restore an extracted feature to a size of 512*512 with the number of channels unchanged; expanding a channel dimension of a feature image of 512*512 to be the same as the number of defect categories using a 1*1 convolutional layer, wherein the defect categories comprise warping, wrinkling, twisting, lapping and normal; and calculating a final segmentation probability by a softmax function; wherein the downsampling network and the upsampling network are connected by Skip-connection between layers, and the Skip-connection between layers is to concat an output of each feature extraction layer of the downsampling network with an output of the corresponding layer of the same size in the upsampling network;

(S502) inputting the plane distance error image to the semantic segmentation network to obtain a defect segmentation information; and calculating a loss function between the defect segmentation information and GroundTruth, wherein the loss function is calculated as follows using cross entropy:

$$L = -\frac{1}{b}\sum_{b}\sum_{i=1}^{rows}\sum_{j=1}^{cols}\sum_{k=1}^{c} label_k^{i,j} \log(y_k^{i,j}); \quad (2)$$

wherein $label_k^{i,j}$ represents a One-Hot encoded label; $y_k^{i,j}$ is an output of the semantic segmentation network; b is the number of batches; rows represents the number of image rows; cols is the number of image columns; c is the number of the categories; i corresponds to a row coordinate of a network row; j corresponds to a column coordinate of a network column; and k is a serial number of the category label;

(S503) continuously updating and optimizing parameters of the semantic segmentation network using backpropagation Adam optimization algorithm to allow the output to be continuously close to the GroundTruth; wherein when an accuracy of a validation set is kept stable, a training of the semantic segmentation network is completed to obtain the pre-trained semantic segmentation network; and (S504) inputting the plane distance error image to the pre-trained semantic segmentation network for segmentation to obtain a 512*512*5 output; and calculating an argmax of a point at each position, so as to finally obtain a 512*512*1 output, wherein the 512*512*1 output is a defect area and defect category.

In an embodiment, the step (S6) is performed through steps of:

(S601) mapping a segmented defect result output by the semantic segmentation network to point cloud areas corresponding to the plurality of sub-bounding boxes of the surface point cloud; and marking the point cloud areas with different colors followed by visualization; and (S602) calculating an average error distance between a point cloud area of each defect and the fitted plane and a distance variance to be an evaluation index for the surface of the automated fiber placement composite.

Compared with the prior art, this application has the following beneficial effects. The method provided herein is capable of realizing the high-accuracy detection of the surface defects of the automated fiber placement composite and recognition of the defect category to solve the problems of low detection efficiency and accuracy and poor applicability in the prior art.

DETAILED DESCRIPTION OF EMBODIMENTS

This application will be described in detail below with reference to the accompanying drawings and embodiments.

Figure 1:
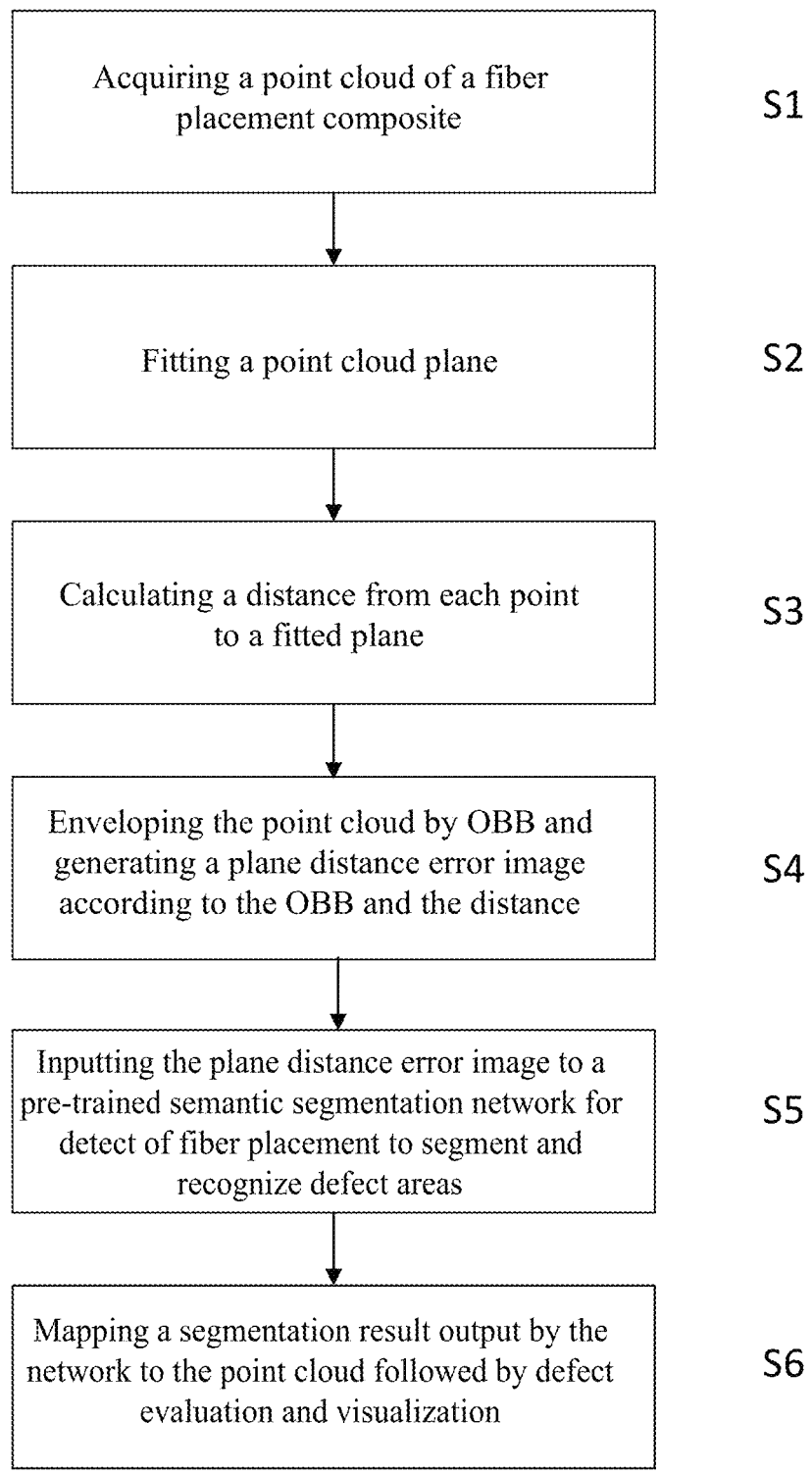
FIG. 1 is a flow chart of a method for detecting and recognizing surface defects of an automated fiber placement composite based on an image converted point clouds according to an embodiment of the present disclosure.

As shown in FIG. 1, a method for detecting and recognizing surface defects of an automated fiber placement composite based on an image converted from point clouds is illustrated, which includes the following steps.

(S1) A surface point cloud of an automated fiber placement composite is acquired.

Figure 2:
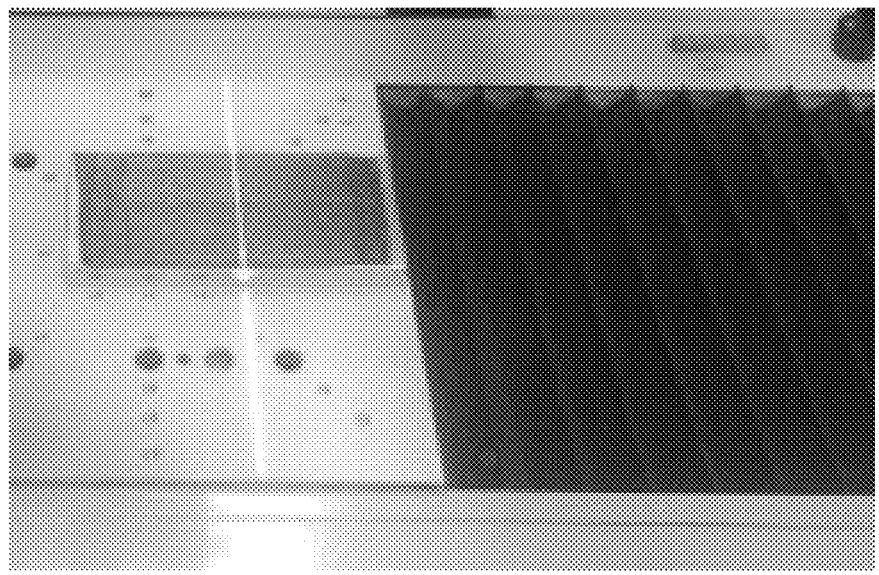
FIG. 2 schematically illustrates an acquisition of a surface point cloud of the automated fiber placement composite according to an embodiment of the present disclosure.

An automated fiber placement composite is placed on a linear motor module motion platform, and a 3D camera is directly set up above the linear motor module motion platform. After fiber placement, the linear motor module motion platform drives the automated fiber placement composite to move through an area captured by the 3D camera to complete an acquisition of the surface point cloud of the automated fiber placement composite, referring to FIG. 2.

(S2) A plane is fitted to the surface point cloud.

(S201) Three non-collinear points are randomly selected from the surface point cloud, and an equation of a plane determined by the three non-collinear points is calculated.

(S202) A threshold T is set. A distance from other points in the surface point cloud to the plane determined by the three non-collinear points is calculated, where when a<T, a corresponding point is regarded as an interior point.

(S203) Steps (S201)-(S202) are repeated/(artificial setting) times, where/is a preset maximum number of iterations. A plane with the most interior points are selected. And all interior points are fitted to obtain a final plane equation: Ax+By+Cz+D=0.

(S3) A distance from each point of the surface point cloud to the fitted plane is calculated, which is performed through the following step.

An Euclidean distance from each point of the surface point cloud to the fitted plane is calculated, where an equation for calculating a distance d from a point $(x_0, y_0, z_0)$ to a plane Ax+By+Cz+D=0 is expressed as follows:

$$d = \frac{|Ax_0 + By_0 + Cz_0 + D|}{\sqrt{A^2 + B^2 + C^2}}. \quad (1)$$

(S4) The surface point cloud is enveloped by an oriented bounding box (OBB), and a grayscale image is generated according to the OBB and the distance calculated in step (S3), where the step (S4) is performed through the following steps.

(S401) By means of an OBB algorithm, a minimum bounding box enveloping the surface point cloud is determined, whose cube side length is always in the same direction as a principal component of the surface point cloud of the fiber placement composite. A covariance matrix of the surface point cloud of the fiber placement composite is constructed to calculate eigenvalues and eigenvectors, so as to determine a bounding box. The covariance matrix for generating an OBB bounding box is specifically as follows:

$$A = \begin{bmatrix} conv(x, x) & conv(x, y) & conv(x, z) \\ conv(x, y) & conv(y, y) & conv(y, z) \\ conv(x, z) & conv(y, z) & conv(z, z) \end{bmatrix}; \quad (2)$$

where an conv operation, conv(x,y) is taken as an example;

$$conv(x, y) = \frac{\sum_{i=1}^{m}(x_i - \bar{x})(y_i - \bar{y})}{m - 1}; \quad (3)$$

where $\bar{x}$ and $\bar{y}$ are average values of x, y axes, respectively. The constructed covariance matrix A is used to solve its eigenvectors and eigenvalues. Considering that the covariance matrix A is a symmetric matrix, properties of the symmetric matrix is known. Three eigenvectors of the covariance matrix A are perpendicular to each other to determine three axes of an OBB model.

Subsequently, the eigenvectors are normalized to determine directions of the three axes of the OBB bounding box. A coordinate of the surface point cloud of the fiber placement composite is projected on the three axes to determine a maximum value and a minimum value of each axis, such that an OBB bounding box of the surface point cloud of the fiber placement composite is determined.

(S402) The minimum bounding box is uniformly divided into 512*512 sub-bounding boxes along a direction parallel to the fitted plane.

(S403) A distance between each point in each of the plurality of sub-bounding boxes and the fitted plane is calculated and an average distance between each of the plurality of sub-bounding boxes and the fitted plane is calculated.

Figure 3:
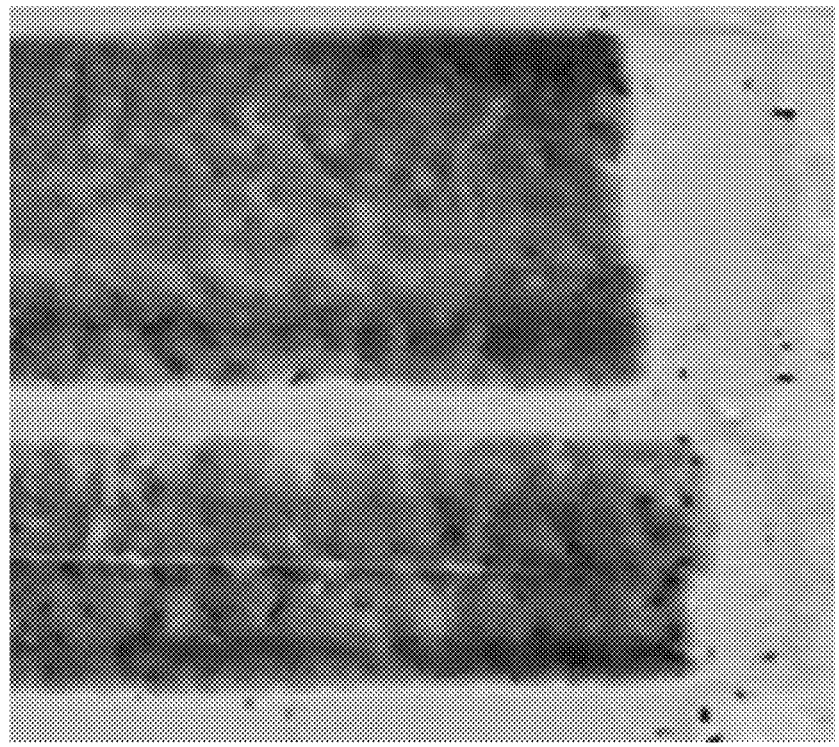
FIG. 3 is a plane distance error image according to an embodiment of the present disclosure.

(S404) The average distance between each of the plurality of sub-bounding boxes and the fitted plane is normalized. A normalized average distance is converted into an image gray scale ranging from 0 to 255, such that the surface point cloud included in each of the plurality of sub-bounding boxes is defined as a pixel, and the average distance between each of the plurality of sub-bounding boxes and the fitted plane is taken as a gray value of the corresponding pixel to generate a plane distance error image with a size of 512*512, as shown in FIG. 3.

(S5) A pre-trained semantic segmentation network for defect of fiber placement is constructed and the grayscale image generated in step (S4) is input into the pre-trained semantic segmentation network to segment and recognize defect areas on the grayscale image, which is performed through the following steps.

Figure 4:
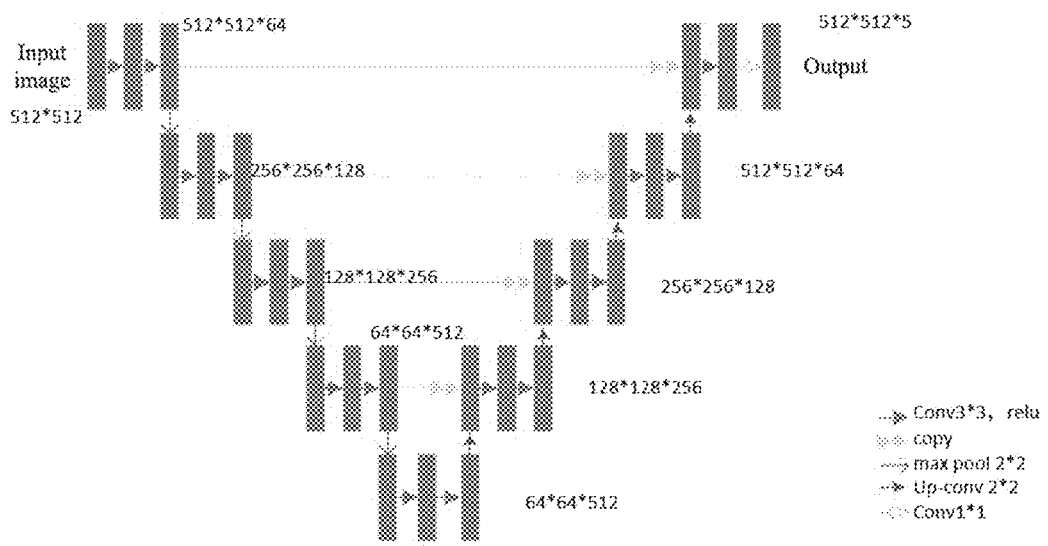
FIG. 4 is a structural diagram of a semantic segmentation network of the fiber placement defect categories according to an embodiment of the present disclosure.

(S501) A semantic segmentation network for defect of the fiber placement is constructed based on U-Net, where an input of the semantic segmentation network is the plane distance error image. The semantic segmentation network includes a downsampling network and an upsampling network. The downsampling network uses a 3*3 convolutional layer for feature extraction. Every two convolutional layers are followed by a maximum pooling layer for downsampling, and such repeating structure has five layers. Subsequently an output of the downsampling network is subjected to upsampling using a 2*2 deconvolutional layer, where after the upsampling, two 3*3 convolutional layers are adopted for feature extraction, and such repeating structure has four layers to restore an extracted feature to a size of 512*512 with the number of channels unchanged. A channel dimension of a feature image of 512*512 is expanded to be the same as the number of defect categories using a 1*1 convolutional layer, where the defect categories include warping, wrinkling, twisting, lapping and normal. A final segmentation probability is calculated by a softmax function, where the downsampling network and the upsampling network are connected by Skip-connection between layers. The Skip-connection between layers is to concat an output of each feature extraction layer of the downsampling network with an output of the corresponding layer of the same size in the upsampling network. The specific structure of the network is shown in FIG. 4.

(S502) The plane distance error image is input into the semantic segmentation network to obtain a defect segmentation information. A loss function between the defect segmentation information and GroundTruth is calculated, where the loss function is calculated as follows using cross entropy:

$$L = -\frac{1}{b}\sum_{b}\sum_{i=1}^{rows}\sum_{j=1}^{cols}\sum_{k=1}^{c} label_k^{i,j} \log(y_k^{i,j}); \quad (4)$$

where $label_k^{i,j}$ represents One-Hot encoded label; $y_k^{i,j}$ is an output of the semantic segmentation network; b is the number of batches; rows represent the number of image rows; cols is the number of image columns; c is the number of the categories.

(S503) Parameters of the semantic segmentation network are continuously updated and optimized using backpropagation Adam optimization algorithm to allow the output to be continuously close to the GroundTruth. When an accuracy of a validation set is kept stable, a training of the semantic segmentation network is completed to obtain the pre-trained semantic segmentation network.

(S504) The plane distance error image is input to the pre-trained semantic segmentation network for segmentation to obtain a 512*512*5 output. An argmax of a point at each position is calculated, so as to finally obtain a 512*512*1 output, where the 512*512*1 output is a defect area and defect category.

(S6) A segmentation result output by the semantic segmentation network is mapped to the point clouds followed by defect evaluation and visualization, which is performed through the following steps:

(S601) A segmented defect result output by the semantic segmentation network is mapped to point cloud areas corresponding to the plurality of sub-bounding boxes of the surface point cloud. The point cloud areas are marked with different colors (different defect categories with different color) followed by visualization.

(S602) An average error distance between a point cloud area of each defect and the fitted plane and a distance variance is calculated to be an evaluation index for the surface of the automated fiber placement composite.

Described above are merely preferred embodiments of the disclosure, which are not intended to limit the scope of the application. It should be understood that any replacements, modifications and changes made by those skilled in the art without departing from the spirit of the application shall fall within the scope of the present application defined by the appended claims.

What is claimed is:

1. A method for detecting and recognizing surface defects of an automated fiber placement composite based on an image converted from point clouds, comprising:
   (S1) acquiring a surface point cloud of the automated fiber placement composite;
   (S2) fitting a plane to the surface point cloud;
   (S3) calculating a distance from each point of the surface point cloud to a fitted plane;
   (S4) enveloping the surface point cloud by an oriented bounding box (OBB), and generating a grayscale image according to the OBB and the distance calculated in step (S3); wherein the step (S4) is performed through steps of:
   (S401) by means of an OBB algorithm, determining a minimum bounding box enveloping the surface point cloud;
   (S402) uniformly dividing the minimum bounding box into 512*512 sub-bounding boxes along a direction parallel to the fitted plane;
   (S403) calculating a distance between each point in each of the plurality of sub-bounding boxes and the fitted plane, and calculating an average distance between each of the plurality of sub-bounding boxes and the fitted plane; and
   (S404) normalizing the average distance between each of the plurality of sub-bounding boxes and the fitted plane, and converting a normalized average distance into an image gray scale ranging from 0 to 255, such that the surface point cloud included in each of the plurality of sub-bounding boxes is defined as a pixel, and the average distance between each of the plurality of sub-bounding boxes and the fitted plane is taken as a gray value of the corresponding pixel to generate a plane distance error image with a size of 512*512;
   (S5) constructing a pre-trained semantic segmentation network for defect of fiber placement, and inputting the grayscale image generated in step (S4) into the pre-trained semantic segmentation network to segment and recognize defect areas on the grayscale image; and
   (S6) mapping a segmentation result output by the semantic segmentation network to the point clouds followed by defect evaluation and visualization.

2. The method of claim 1, wherein the step (S1) is performed through steps of:
   placing the automated fiber placement composite on a linear motor module motion platform, and setting up a 3D camera directly above the linear motor module motion platform; after fiber placement, driving, by the linear motor module motion platform, the automated fiber placement composite to move through an area captured by the 3D camera to complete an acquisition of the surface point cloud of the automated fiber placement composite.

3. The method of claim 1, wherein the step (S2) is performed through steps of:
   (S201) randomly selecting three non-collinear points from the surface point cloud, and calculating an equation of a plane determined by the three non-collinear points;
   (S202) setting a threshold T, and calculating a distance from other points in the surface point cloud to the plane determined by the three non-collinear points, wherein when a<T, a corresponding point is regarded as an interior point; and
   (S203) repeating steps (S201)-(S202) l times; wherein l is a preset maximum number of iterations; selecting a plane with the most interior points; and fitting all interior points to obtain a final plane equation: $Ax+By+Cz+D=0$.

4. The method of claim 3, wherein the step (S3) is performed through steps of:
   calculating an Euclidean distance from each point of the surface point cloud to the fitted plane; wherein an equation for calculating a distance d from a point $(x_0,y_0,z_0)$ to a plane $Ax+By+Cz+D=0$ is expressed as follows:

$$d = \frac{|Ax_0 + By_0 + Cz_0 + D|}{\sqrt{A^2 + B^2 + C^2}}. \qquad (1)$$

5. The method of claim 4, wherein the step (S5) is performed through steps of:
   (S501) constructing a semantic segmentation network for defect of the fiber placement based on U-Net, wherein an input of the semantic segmentation network is the plane distance error image; the semantic segmentation network comprises a downsampling network and an upsampling network; the downsampling network uses a 3*3 convolutional layer for feature extraction; every two convolutional layers are followed by a maximum pooling layer for downsampling, and such repeating structure has five layers; subsequently subjecting an output of the downsampling network to upsampling using a 2*2 deconvolutional layer; wherein after the upsampling, two 3*3 convolutional layers are adopted for feature extraction, and such repeating structure has four layers to restore an extracted feature to a size of 512*512 with the number of channels unchanged; expanding a channel dimension of a feature image of 512*512 to be the same as the number of defect categories using a 1*1 convolutional layer, wherein the defect categories comprise warping, wrinkling, twisting, lapping and normal; and calculating a final segmentation probability by a softmax function; wherein the downsampling network and the upsampling network are connected by Skip-connection between layers, and the Skip-connection between layers is to concat an output of each feature extraction layer of the downsampling network with an output of the corresponding layer of the same size in the upsampling network;

(S502) inputting the plane distance error image to the semantic segmentation network to obtain a defect segmentation information; and calculating a loss function between the defect segmentation information and GroundTruth, wherein the loss function is calculated as follows using cross entropy:

$$L = -\frac{1}{b}\sum\nolimits_{b}\sum\nolimits_{i=1}^{rows}\sum\nolimits_{j=1}^{cols}\sum\nolimits_{k=1}^{c} label_k^{i,j}\log(y_k^{i,j}); \quad (2)$$

wherein $label_k^{i,j}$ represents a One-Hot encoded label; $y_k^{i,j}$ is an output of the semantic segmentation network; b is the number of batches; rows represents the number of image rows; cols is the number of image columns; c is the number of categories; i corresponds to a row coordinate of a network row; j corresponds to a column coordinate of a network column; and k is a serial number of a category label;

(S503) continuously updating and optimizing parameters of the semantic segmentation network using back-propagation Adam optimization algorithm to allow the output to be continuously close to the GroundTruth; wherein when an accuracy of a validation set is kept stable, a training of the semantic segmentation network is completed to obtain the pre-trained semantic segmentation network; and (S504) inputting the plane distance error image to the pre-trained semantic segmentation network for segmentation to obtain a 512*512*5 output; and calculating an argmax of a point at each position, so as to finally obtain a 512*512*1 output, wherein the 512*512*1 output is a defect area and defect category.

6. The method of claim 4, wherein the step (S6) is performed through steps of:

(S601) mapping a segmented defect result output by the semantic segmentation network to point cloud areas corresponding to the plurality of sub-bounding boxes of the surface point cloud; and marking the point cloud areas with different colors followed by visualization; and (S602) calculating an average error distance between a point cloud area of each defect and the fitted plane and a distance variance to be an evaluation index for the surface of the automated fiber placement composite.

* * * * *